(No Model.)
E. THOMSON.
ELECTRIC RAILWAY SYSTEM.
No. 516,666. Patented Mar. 20, 1894.
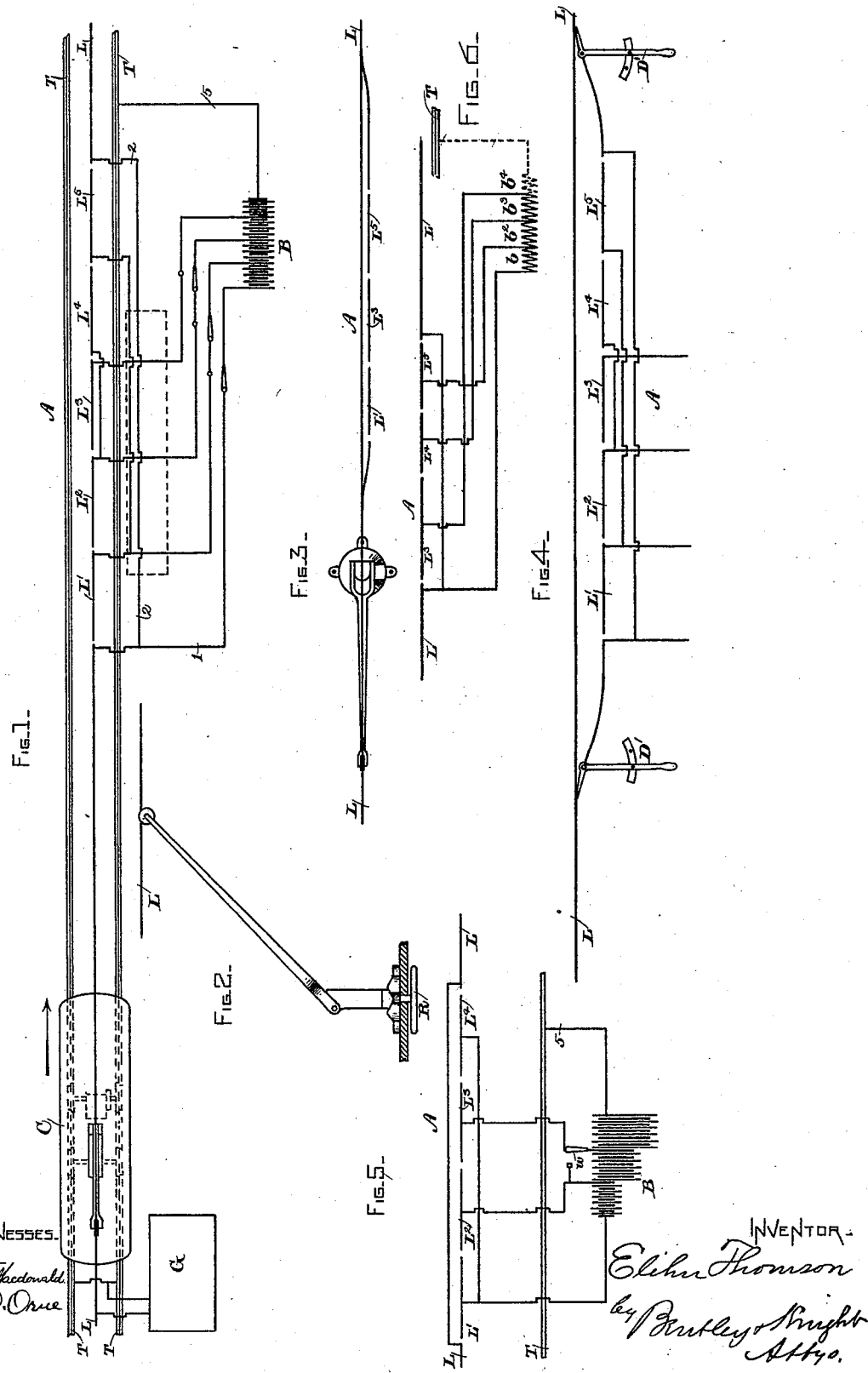

UNITED STATES PATENT OFFICE.

ELIHU THOMSON, OF SWAMPSCOTT, MASSACHUSETTS, ASSIGNOR TO THE THOMSON-HOUSTON ELECTRIC COMPANY, OF CONNECTICUT.

ELECTRIC-RAILWAY SYSTEM.

SPECIFICATION forming part of Letters Patent No. 516,666, dated March 20, 1894.

Application filed May 29, 1891. Serial No. 394,497. (No model.)

*To all whom it may concern:*

Be it known that I, ELIHU THOMSON, a citizen of the United States, residing at Swampscott, in the county of Essex and State of Massachusetts, have invented certain new and useful Improvements in Electric-Railway Systems, of which the following is a specification.

My present invention relates to a system of electric supply for railways, being particularly applicable to the case of railways in which set stoppages are made at stations, or at various predetermined points along the line.

The object of the invention is to secure economy in operation, and to avoid the difficulties of sudden starting such as are experienced in ordinary electric railway work, and which make it necessary to employ graduated resistances or other means for controlling the strength and torque of the motor so as to prevent excessive current at the start.

My invention may also provide means for storing up some of the energy of stoppage or breaking for the purpose of utilizing it again for starting the train. The action is accomplished by special arrangements of the supply conductors and stationary apparatus connected therewith and not by any devices carried on the vehicle.

In the accompanying drawings Figure 1 is a diagram of a stopping place on a track, showing a car approaching the same, and the apparatus and circuit connections requisite for carrying out my invention. Figs. 2, 3, 4, 5 and 6 show modifications.

In Fig. 1, T, T, represents the track, on which a car or vehicle C is propelled by electric action, being provided with a motor connected to its driving wheel. The track T, T, in the figure is used as the return circuit, though of course it might be replaced by a separate return conductor. The generator G represents a current supplying source such as a power station, one main being connected to the line L, L, and the other to the track T, T or return conductor. The line L, L, is arranged to be traversed by a contact mechanism such as a trolley for carrying current to the motor on the vehicles. Let it be assumed that it is desired to have the vehicle stop at approximately a point A along the line of track which may represent a station or other stopping point. The vehicle C which may be a train of cars drawn by an electric locomotive or which may be any other self-propelled vehicle or vehicles operated electrically from the line L, L, will run at speed on that portion of the line a moderate distance on each side of the point A, but will require to be diminished in speed on reaching the point A and increased in speed on leaving the same. During these periods of retardation and acceleration, my invention comes into play. Near the point A or stopping place and on each side of it, I cut the line L, L, into sections $L'$, $L^2$, $L^3$, $L^4$, which may be any convenient number and which normally are insulated from each other so far as the line connections themselves are concerned, but from each section connection is made to a device such as a storage battery B, having the property of taking in energy and giving it out again as needed. Any other device having the property of the battery or the property of storing the electric energy and giving it out again can be employed in place of the battery. When the battery is used it is only requisite that its storage capacity be of very moderate amount and it may therefore be constructed simply of lead plates suspended in acid or immersed in acid, as it is only required to take in a charge during a very short interval and give it out at a short interval thereafter. The number of plates in the battery B is chosen as that amount which readily gives the full counter-electromotive force required to prevent escape of current from the line L to the track, but may somewhat exceed the amount required for this purpose.

The connections may be made as follows:— The two ends of the line, beyond the sections on either side are connected together by bridge 2 and by wire 1 to one terminal of the storage battery or equivalent, the other terminal of said battery being connected at 5 to the track or return conductor T. Starting from the section which is next the line on one side, connections are made from the successive sections to points of the battery intermediate between the line and ground terminals thereof, so that each section is connected to a point of lower potential than the preceding one until the actual stopping point is reached, the succeeding sections being connected to points of progressively increasing potential. This gives a graduated or stepped fall of potential along the line sections from both ends, that is, from the line, to the stopping and starting point. The number of sections on each side of the stop may be equal, in which case they may be connected in pairs, as shown, $L^2$ having the same potential as $L^4$, and so on. As soon as the vehicle C which is traveling at full speed in the position shown, approaches the stopping place A and its contact or trolley leaves the main line and passes to the section $L'$, its motors will cease to receive from the main line the full potential, and may, on the other hand be connected so that there will be a reversed current or charging electric potential between the track and section $L'$. In either case, the vehicle begins to run slower and in the latter case an actual braking action is produced which tends to charge the battery. On reaching the section $L^2$ at the diminished speed a further falling off of the potential supplied to the vehicle occurs and under certain conditions a further charging action or braking action or consumption of energy of the moving vehicle takes place which is converted into electrical energy in the battery. On reaching the section $L^3$ the same action is again continued, and by the application of friction brakes the train may now readily be brought to a standstill on this section. Of course the lengths of the sections as shown in Fig. 1 are by no means what would be required in practice in relation to the length of the vehicle. Each section may be made of a length dependent on the conditions, especially the speed of running and therefore the time during which the braking has to be accomplished. The number of sections would of course be varied for different conditions. Assuming that the circuit through the motor has been interrupted now and that the vehicle is at rest on section $L^3$ with its brakes set, the brakes may be relaxed and the vehicle is ready for a start. Connection being made again with the circuit the motors on the vehicle receive the comparatively low potential delivered to the section $L^3$, which may in part be supplied by the main line and part by the battery which has become charged, namely the last section of the battery, and it gradually starts up. On arriving at the section $L^4$ under slow headway the potential becomes the same as section $L^2$ and acceleration takes place, and so on through section $L^5$ of the same potential as section $L'$, and finally the vehicle or train reaches the main line where it again receives the full potential and soon attains full speed. It is desirable, though not essential, that the point of stoppage of the vehicle be somewhat beyond the middle of section $L^3$ in the direction of motion, so that the vehicle may on being accelerated after stoppage, soon pass off the lowest potential section and reach the next higher section. It will be seen that by this system of working, in the first place, there is obtained the advantage of diminished potentials during stoppage and acceleration and that the arrangements may be made so as to secure an actual storage of energy of the train to be retarded which energy is utilized, at least in part, when the acceleration after stoppage is required. It is not essential however, that this latter feature be present. The stoppage of the train might of course be made by cutting off the current and putting on the brakes in the ordinary way. In this case sections $L'$, $L^2$ would be of little value and might be dead sections, or the line could be continued up to the first starting section. The sections $L^3$, $L^4$, $L^5$, &c., would be retained and would give a graduated potential during the accelerating process. This manner of procedure might be advantageous where the line was arranged so as to make the quickest stops possible but without the most economical acceleration. The action on the battery B is one of constant charge and discharge of its various sections, and the sections may be chosen equal or unequal in the number of elements, as desired, the effects being somewhat modified by the particular arrangement selected.

The storage battery or its equivalent has, as above described, two functions, one is to conserve and render available the energy or *vis viva* of the moving train, and the other is to apply to the motor on the vehicle an electro motive force less than that of the line, and graduated or decreased or augmented so as to apply to the vehicle under different conditions, different electro-motive forces adapted to such conditions. Thus it is evident, that it may be replaced by any counter electric potential device. Moreover, disregarding the storage feature, and considering only the advantage of applying to the vehicle in starting a gradually increasing electro motive force, at least one that is initially lower than that of the line, so as to enable easy starting and prevent a dangerously large initial current, it will be seen that this feature of my invention may be carried out by applying in any way to the proper portions of the line electro motive forces less than that of the line in general. For example, as illustrated in Fig. 6, resistances $b$, $b^2$, $b^3$, $b^4$ may be substituted for the sections of the battery to lower the effective electro motive forces of the sections from that of the line in any desired degree or degrees. In some cases the connection 5 to the return conductor may be omitted, especially if resistances are used as just described. In that case, the resistances, or their equivalents, are cut successively into and out of circuit to decrease or increase the effective electro-motive force. As to the storage feature it may be stated, that while it is desirable to utilize the stored energy derived from stopping the vehicle to shortly thereafter start the same, it is obvious that having been once so started, it is a source of energy that may be drawn upon for various purposes, and in this connection my invention may be variously modified and extended. The battery may also be variously connected. Thus in Fig. 5 the line L, L, has no connection with the storage battery B, but is simply connected around the brake as shown, while the successive sections L, L², L³, L⁴, are coupled up in pairs as before, to different points of the battery, one terminal of which is grounded at 5, so that when the battery is charged, the potential is higher in the end sections, successively decreasing toward the middle. It will be seen that when the vehicle runs at full speed from the line onto the first section, there will be at once a braking action on the vehicle and a charging of the battery, and the sections are so arranged that when the speed becomes so reduced that the electro-motive force of the vehicle motor, now acting as a dynamo, falls to that of the charge it has imparted to the battery, it runs onto the next section connected to less cells, and so the charging and the braking action continue, until the speed is greatly reduced, when the stop may be effected by opening the current and setting the brakes. In starting again, the cells of the battery are cut in, in the reverse order of their cutting out, so as to give a more or less gradually increasing electro-motive force. A switch $w$ may be shifted at moment of starting, so as to throw more cells into connection with the first starting section in case the end battery section is not sufficient for starting. It will be seen that the time of action in charging and discharging increases from the upper to the lower cells of the battery and they are therefore correspondingly varied in capacity as indicated.

Figs. 2, 3 and 4 represent means for enabling an express or through and a local service to be had on the same line, the through service car or one which is not to stop at the given station, being kept on an unbroken line from L to L, while if the vehicle is to be stopped at the station, the trolley is switched onto the said sectional conductor L², having the battery or equivalent connections as before for aiding the stopping and starting. The turning aside onto the branch conductor may be effected by manually shifting or turning the trolley, as by a manually operated device R on the car, or by picking up the trolley from the line by switches D' arranged at one or both ends of the branch conductor, and set by track operatives or switchmen, or otherwise. The device R is shown as a hand wheel, secured upon a vertical rotatable shaft, which carries the trolley pole.

My invention is particularly applicable to cases in which the stoppages are frequent and at determined points requiring a large expenditure of electric energy in producing acceleration only, and is designed to obviate, to a considerable extent, the large losses occasioned thereby, and at the same time to secure a gradual action without dead or variable resistances or other energy consuming devices carried on the train or vehicle.

What I claim as new, and desire to secure by Letters Patent, is—

1. The combination with the vehicle electrically propelled along a line of way, and having definite stopping and starting points thereon, of one or more conductors at such points making connection with the electric motor on said vehicle, and an energy storage device in connection with said conductors.

2. In an electric railway system, the combination with a vehicle electrically propelled along a line of way, of means for stopping and starting said vehicle at definite points on said line of way, consisting of a series of conductor sections located near such points and making connection with the vehicle, and a storage battery, having connections from points of different effective potential to the various sections, the potential decreasing from each end section toward the middle.

3. In an electric railway system, the combination of the line or supply and return conductors, an electrically propelled vehicle making connection therewith, a storage battery connected at its opposite terminals to the aforesaid supply and return conductors respectively, and one or more conductor sections making connection with the vehicle, and connected to the battery at a point or points intermediate the terminals in position or potential.

4. In an electric railway system the combination of the line or supply and return conductors, an electrically propelled vehicle making connection therewith, a storage battery connected at its opposite terminals to the aforesaid conductors respectively and a series of conductor sections located near such points and making connection with the vehicle, and respectively connected to points of the battery intermediate the terminals in position or potential, the potential decreasing from each end section toward the middle.

5. In an electric railway system the combination of the line or supply and return conductors, the electrically propelled vehicle having a moving contact therewith, and means for applying a graduated or increasing electro-motive force to said vehicle at certain points of the line of way, consisting of a series of sectional conductors separate from the line conductor, but connected thereto through a series of counter electro-motive force generators, and making connection successively with the moving vehicle.

6. In an electric railway system, the combination of the line or supply conductor and a section conductor supplied with current of lower electro-motive force than the line conductor, with an electrically propelled vehicle making successive connection with said conductors, for the purpose set forth.

7. In an electric railway system, the line or supply conductor, a series of section conductors connected to said line conductor through resistant or equivalent devices for lowering the effective electro-motive force of said sections from that of the line in a successive and graduated manner, in combination with an electrically propelled vehicle making successive connection with such conductors.

8. In an electric railway system, the combination of the line or supply conductor, and a section conductor connected thereto through a resistant or current opposing device, and an electrically propelled vehicle making successive connection with said conductors.

9. An electric railway system carrying a line conductor, a conductor branching therefrom and having a section supplied with current of lower electro-motive force than that of the line conductor, and an electrically propelled vehicle having a shiftable contact for connection with either of said conductors.

10. The combination of the continuous line conductor, the branch conductor connected at both ends thereto, and having one or more sections supplied with a current of lower electro-motive force than that of the line, and a vehicle having a contact adapted for connection with either of such conductors, substantially as and for the purpose set forth.

11. In an electric railway system, the combination of the electrically propelled vehicle having one or more definite starting places, with the supply and return conductors, and a series of counter electric potential devices connected between said conductors and having intermediate connections of progressively increasing potential to sections of the line at the said starting places.

In witness whereof I have hereunto set my hand this 23d day of May, 1891.

ELIHU THOMSON.

Witnesses:
JOHN W. GIBBONEY,
BENJAMIN B. HULL.